Patented Sept. 24, 1940

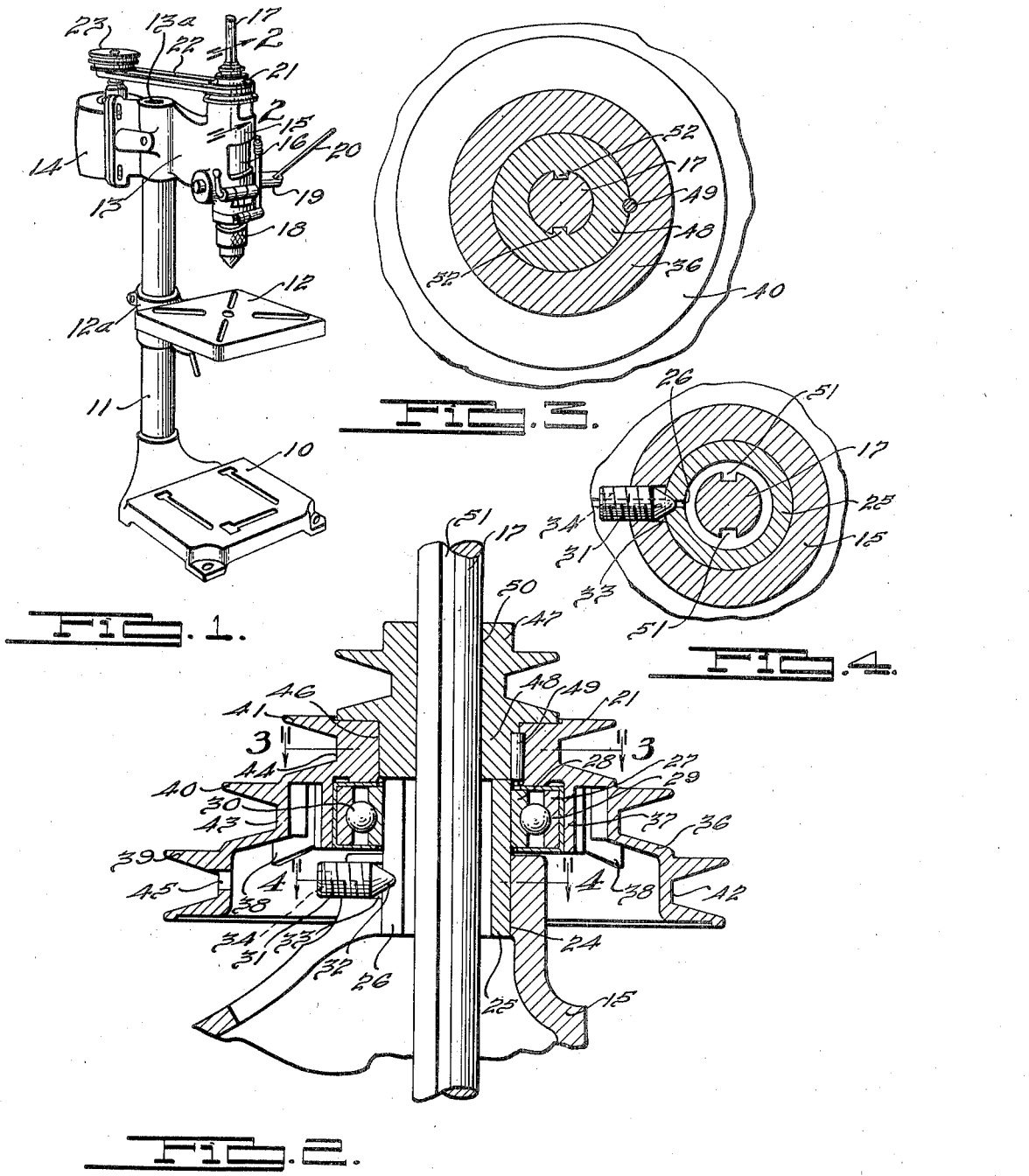

2,215,681

UNITED STATES PATENT OFFICE 2,215,681

DRILL PRESS

James W. Wilford and Samuel S. Hargraves, Lansing, Mich., assignors to Melling Forging Company, Lansing, Mich., a corporation of Michigan Application October 11, 1937, Serial No. 168,375

3 Claims. (Cl. 308—236)

This invention relates to drive pulleys for rotary spindles or shafts and the means for mounting such pulleys in their supporting structures.

The invention is particularly adapted for use in drill presses, but it may be used with other machines embodying rotating spindles, and it is also adapted for use with line shafting.

Drive pulleys for rotary shafts are ordinarily made in one piece, particularly the relatively small pulleys driven by V belts. It is often desirable to form such pulleys from aluminum or zinc die castings, as these metals are easily cast, and are much lighter than iron or steel. They have the disadvantage, however, of being relatively soft, thus rendering it difficult to provide a driving connection between a pulley and spindle that will stand up under heavy loads. The usual keyed or splined drive connection will often tear the soft metal of the pulley when the driving torque is relatively high.

Furthermore the usual mounting of pulleys of the aforementioned type on their supports is rather complicated, necessitating special bearings which add to the cost of the construction.

It is accordingly an object of the present invention to provide an improved pulley, which may be made in two parts, one a die casting or relatively soft, light metal, and the other machined from harder materials.

A further object of the invention is to provide an improved means for mounting a pulley on a support, which is cheaply and simply manufactured and assembled.

Other objects of the invention will become apparent in the following specification when read in connection with the attached drawing, wherein like numerals designate corresponding parts in several views.

In the drawing:

Figure 1 is a perspective view of a drill press embodying my invention;

Figure 2 is a fragmentary vertical sectional view taken on substantially the line 2—2 of Figure 1;

Figure 3 is a fragmentary sectional view taken on substantially the line 3—3 of Figure 2; and Figure 4 is a fragmentary sectional view taken on substantially the line 4—4 of Figure 2.

Referring now more particularly to Figure 1, there is shown a drill press having a base 10 which supports a cylindrical column 11. A table 12 is mounted on a bracket 12a which is adapted to be moved vertically on the column and clamped thereon in any set position. At the upper end of the column is a head 13 which is formed from a hollow iron casting.

The head is provided with a cylindrical hole 13a into which the column 11 is inserted and the head is then clamped to the column. The head 13 forms a support for the motor 14 which is clamped thereto with the shaft of the motor in vertical position. The head 13 is also provided with an enlarged spindle housing 15 in which is located the usual reciprocatory quill 16.

The quill 16 carries the rotary spindle, 17 on the lower end of which is mounted the chuck 18. The quill is adapted to be reciprocated by means of a gear on a rotary shaft 19 turned by a handle 20. The gear meshes with the usual rack on the quill 16. Neither the gear nor the rack are shown, as they are conventional and form no part of this invention.

A stepped pulley 21 is rotatably mounted on the upper end of spindle housing 15, and connected to the spindle 17 in such a manner that rotary movement of the pulley will be imparted to the spindle but the spindle may slide vertically in the pulley. The particular mounting used will be described later. A stepped pulley 23 is rigidly mounted on the shaft of motor 14 and the two pulleys are connected by a V-belt 22. It will be noted from Fig. 1, that the two pulleys 21 and 23 are oppositely arranged whereby the relative speeds of the driving and driven pulley may be changed by merely shifting the belt, in the conventional manner.

Figures 2, 3 and 4 show the construction of the improved pulley and its mounting. The spindle housing 15 has a vertically extending bore 24 which is machined to cylindrical form. Within this bore 24 is a sleeve 25 which has a portion extending vertically outwardly therefrom. This sleeve has an elongated radially extending slit 26. A set screw 31 which has a tapered end 32 is threaded into an opening 33 in one wall of the housing so that the tapered portion 32 of the set screw 31 enters the slit 26 of the sleeve 25. The set screw 31 has a square recess in the head thereof for the reception of a square headed wrench (not shown) with which the set screw may be tightened.

A ball bearing 27 surrounds the sleeve 26 and is adapted to fit snugly thereon. The bearing is of conventional form, consisting of an inner race 28, outer race 29, and a plurality of balls 30 arranged between the two races.

The pulley 21 is mounted on the bearing 27 to rotate thereon. This pulley consists of an outer portion 36, which is preferably a zinc or aluminum die casting. The portion 36 of the pulley 21 has an axially extending annular flange 37 interiorly thereof and connected by integral ribs 38 to the main body of the portion 36. The ribs add to the strength of the structure and stiffen the flange 37. The inner diameter of the circular recess formed by flange 37 is such that the outer race 29 of the ball bearing 27 fits therein with a press fit.

As will be seen from the drawing, the portion 36 of the pulley 21 consists of three steps, 39, 40, and 41, and the steps have annular V-shaped grooves 42, 43, and 44 respectively for the reception of the V-belt 22. The pulley is also provided with an aperture 45 for a purpose which will appear later.

The portion 36 of the pulley 21 is provided with a cylindrical bore 46 for the reception of an inner portion 47 of the pulley 21. This portion 47 is preferably machined from iron or steel, and has a cylindrical end portion 48 which is of a size such that it will need to be driven into the bore 46 of the outer portion 36 of the pulley. A circular pin 49 is driven into a drilled hole between the meeting faces of the portions 36 and 47 of the pulley 21, in order to rigidly lock the two portions of the pulley together.

The portion 47 of the pulley 21 is provided with an internal bore 50 for the reception of the spindle 17. The spindle is grooved at 51 for the reception of two integral driving ribs 52 on the inner walls of the bore 50. In this manner, a driving connection between the portion 47 of the pulley 21 and the spindle 17 is provided, yet the spindle may reciprocate in the bore 50 of the pulley 21.

In assembling the parts, sleeve 25 is inserted in the bore 24 so that the slit 26 will be placed over the aperture 33 in the housing 15. The two parts 36 and 47 of the pulley are driven together, a hole is drilled for the reception of the pin 49, and the pin 49 is then driven into the hole. The bearing 27 is forced into the recess in the pulley, formed by the flange 37. The pulley with its ball bearing supported thereon is placed over the sleeve 25 into the position shown in Figure 2, and a wrench (not shown) is inserted through the hole 45 in the pulley so that its square end enters the recess 34 in the set screw 31. When the wrench is turned, the tapered portion 32 of the set screw 31 will enter the slit 26 and wedge the walls of the slit 26 apart. In this manner, the sleeve 25 is expanded in the bore 24 of the housing 15 and against the inner wall of the bearing race 28, thus holding the parts rigidly together. The quill, which has already been assembled with the spindle 17, is then inserted into the lower end of the spindle housing 15 of the drill press head 13 so that the shaft 17 enters the bore 50 of the pulley 21 with the ribs 52 entering the grooves 51 of the spindle.

Although our invention has been shown as embodied in a drill press, it will be obvious that it is adapted for use on either the driving or driven rotary shafts or spindles of a great many other types of machines. Consequently, we desire the invention to be limited only by the scope of the appended claims.

We claim:

1. In combination, a support having a bore therethrough, a sleeve mounted in said bore and having a portion extending axially outwardly thereof, said sleeve having a radial slit in one side wall, an anti-friction bearing surrounding the outwardly extending portion of said sleeve, and means for expanding said sleeve to tightly engage the inner walls of said bore and said bearing.

2. In combination, a support having a bore therethrough, a sleeve mounted in said bore and having a portion extending axially outwardly thereof, said sleeve having a radial slit in one side wall, an anti-friction bearing surrounding the outwardly extending portion of said sleeve, and a set-screw threaded through a wall of said bore and having a tapered end engaging in said slit for expanding said sleeve to tightly engage the inner walls of said bore and said bearing.

3. In combination, a support having a bore therethrough, an expansible sleeve mounted in said bore and having a portion extending axially outwardly thereof, an anti-friction bearing surrounding the outwardly extending portion of the sleeve, and means for expanding said sleeve to tightly engage the inner walls of said bore and said bearing.

JAMES W. WILFORD.
SAMUEL S. HARGRAVES.